(12) United States Patent
Bragdon

(10) Patent No.: US 8,951,309 B2
(45) Date of Patent: Feb. 10, 2015

(54) HAY-BASED LOGS AND METHOD OF MAKING THE SAME

(71) Applicant: Peter Bragdon, Vassalboro, ME (US)

(72) Inventor: Peter Bragdon, Vassalboro, ME (US)

(*) Notice: Subject to any disclaimer, the term of this patent is extended or adjusted under 35 U.S.C. 154(b) by 0 days.

(21) Appl. No.: 14/198,229

(22) Filed: Mar. 5, 2014

(65) Prior Publication Data

US 2014/0182193 A1  Jul. 3, 2014

Related U.S. Application Data

(63) Continuation-in-part of application No. 13/794,907, filed on Mar. 12, 2013, now abandoned.

(60) Provisional application No. 61/639,116, filed on Apr. 27, 2012.

(51) Int. Cl.
*C10L 5/44* (2006.01)
*C10L 5/46* (2006.01)
*C10L 5/14* (2006.01)
*C10L 5/36* (2006.01)

(52) U.S. Cl.
CPC .............. *C10L 5/445* (2013.01); *Y02E 50/10* (2013.01); *Y02E 50/30* (2013.01); *C10L 5/365* (2013.01)
USPC .................. 44/606; 44/589; 44/551; 44/554

(58) Field of Classification Search
USPC .......... 44/535, 542, 544, 545, 550, 551, 553, 44/554, 560, 565, 568, 571, 572, 576, 589, 44/593, 594, 595, 596, 629, 634, 635, 636, 44/543, 590, 605, 606
See application file for complete search history.

(56) References Cited

U.S. PATENT DOCUMENTS

| 5,393,310 A * | 2/1995 | Wollen ........................... 44/535 |
| 5,755,836 A * | 5/1998 | Beyer ............................ 44/535 |
| 2010/0139155 A1 * | 6/2010 | Mennell et al. ................ 44/535 |
| 2010/0212262 A1 * | 8/2010 | Townsend ...................... 53/438 |
| 2010/0281767 A1 * | 11/2010 | Zeeck ........................... 44/589 |
| 2010/0300368 A1 * | 12/2010 | Myers et al. .................. 119/171 |

FOREIGN PATENT DOCUMENTS

| WO | WO 2011020190 A1 * | 2/2011 |
| WO | WO 2011094403 A1 * | 8/2011 |

* cited by examiner

*Primary Examiner* — Pamela H Weiss
(74) *Attorney, Agent, or Firm* — Dennis R. Haszko

(57) ABSTRACT

A hay-based log formed of a combination of pieces of hay and a binding agent. The hay pieces and the binding agent are compressed together into a solid shape. The hay-based log is fabricated so that the majority of the hay-binder combination is made of the hay. The binder is selected to be sufficient to keep the hay pieces joined together in its selected shape. The binder may be wax paraffin, plastic, corn starch or potato starch or any combination thereof. The hay-based log is fabricated by compressing the hay-binder mixture together with sufficient pressure and temperature to enable the hay pieces to stay together and then cooling the mixture without heat or pressure.

11 Claims, 4 Drawing Sheets

| Formulation # | Hay Particle | Binder, % by Weight | Temperature | | | | Notes on Log Quality |
|---|---|---|---|---|---|---|---|
| | | | Heating Temp, F | Time, hrs | Cooling Temp, F | Time, hrs | |
| 1 | 3/8" | 20% Wax | 120 | 0.5 | 60 | 1 | Slight cracking, but intact |
| 2 | 1/8" | 20% Wax | 120 | 0.5 | 60 | 1 | Slight cracking, but intact |
| 3 | 1/8" | 30% Wax | 120 | 0.5 | 60 | 1 | Good quality |
| 4 | 3/8" | 30% Wax | 120 | 0.5 | 60 | 1 | Good quality |
| 5 | 3/8" | 30% Wax | 120 | 0.5 | 60 | 1 | Slight cracking, but intact |
| 6 | 3/8" | 30% Wax | 120 | 0.5 | 60 | 9 | Good quality, longer cooling time allows wax to solidify |
| 7 | 3/8" | 40% Wax | 120 | 0.5 | 60 | 1 | Good quality |
| 8 | 3/8" | 10% Starch | 225 | 0.5 | 60 | 1 | Significant cracking |
| 9 | 3/8" | 20% Starch | 225 | 0.5 | 60 | 1 | Good quality |
| 10 | 1/8" | 20% DDG | 225 | 0.5 | 60 | 1 | Significant cracking |
| 11 | 3/8" | no binder | 225 | 0.5 | 60 | 1 | Significant cracking |
| 12 | 3/8" | no binder | 250 | 0.5 | 60 | 1 | Significant cracking |
| 13 | 3/8" | 20% Glycerin | 225 | 0.5 | 60 | 1 | Did not form log |
| 14 | 3/8" | 10% starch/10% | 225 | 0.5 | 60 | 1 | Slight cracking, but intact |
| 15 | 3/8" | 20% Plastic | 225 | 0.5 | 60 | 1 | Good quality |

FIG. 3

| Sample | Formulation # | MC Wet basis (%); ASTM E871 | Ash(%); Tappi 211,525 C | Btu/lb as Received | Btu/lb Moisture Free | Btu/lb Moisture and Ash Free (MAF) | Density Lbs/ft3 | Material Cost (4in dia/12 inches long) |
|---|---|---|---|---|---|---|---|---|
| Control "Pine Mountain" | | 3.82 | 0.44 | 14597 | 15177 | 15246 | 78.8 | $0.24 |
| Hay | 12 | 9.18 | 5.26 | 7283 | 8019 | 8513 | 54.6 | $1.59 |
| 40% Wax | 7 | 7.60 | 3.72 | 12622 | 13660 | 14232 | 67.6 | $1.11 |
| 30% Wax | 6 | 10.40 | 4.11 | 11144 | 12437 | 13035 | 59.2 | $0.74 |
| 20% Wax | 2 | 9.54 | 5.19 | 9673 | 10694 | 11345 | 53.3 | $0.88 |
| 20% Plastic | 15 | 7.53 | 4.80 | 9949 | 10759 | 11349 | 71.7 | $0.40 |
| 20% Starch | 9 | 9.90 | 3.99 | 7191 | 7981 | 8351 | 57.7 | $0.33 |
| 20% Glycerin | 13 | 21.65 | 4.40 | 7180 | 9165 | 9709 | 62.4 | $0.33 |
| 20% DDG | 10 | 9.51 | 5.12 | 7663 | 8468 | 8976 | 57.3 | $0.30 |

FIG. 4

HAY-BASED LOGS AND METHOD OF MAKING THE SAME

CROSS REFERENCE TO RELATED APPLICATION

The present application is a continuation-in-part and claims the priority benefit of pending U.S. patent application Ser. No. 13/794,907, tiled Mar. 12,2013, entitled HAY-BASED FUEL LOGS AND METHOD OF MAKING THE SAME by the same inventor, which is a nonprovisional and claims the priority benefit of U.S. provisional patent application Ser. No. 61/639,116, filed Apr. 27, 2012, entitled HAY-BASED FUEL LOGS AND METHOD OF MAKING by the same inventor. The contents of the referenced applications are incorporated herein by reference.

STATEMENT REGARDING FEDERALLY SPONSORED RESEARCH OR DEVELOPMENT

This invention was made using funds obtained from the US Government (USDA Rural Development Grant—VAPG) and the US Government therefore has certain rights in this invention.

BACKGROUND OF THE INVENTION

1. Field of the Invention

Use present invention relates to alternative energy and, more specifically, to a log formed of hay and a binder. The log can be burned for heat, either as a fuel log or as a fire log.

2. Description of the Prior Art

Stoves and other burning devices are a very desirable way of creating heat insofar as they can be economical, simple, effective and pleasant to experience. However, burning wood can be problematic because trees are a very important natural resource, they are very water and time intensive to grow, and don't necessarily deliver the desired heat. Moreover, many states have laws that limit the transport of firewood from one state to another because of bugs and disease that the wood may have. Hay, on the other hand, grows with a minimum investment of time and water. There is a surplus of hay in the United States. Moreover, because non-wood logs do not have the same potential bugs and disease infestation problems as do wood logs, non-wood fuel logs can be transported from state to state. There is a need for reducing wood-based fuel for heating, and increasing hay-based fuel for heating. More specifically, there is a need for hay-based fuel and, more generally, a hay-based log that can be used as fuel or as a fire source. Preferably the log would be easy and economical to produce, transport and use; safe; environmentally friendly; use materials readily available; be usable in pre-existing burning devices; and be capable of delivering heat at a desired level.

SUMMARY OF THE INVENTION

It is an object of the present invention to provide a hay-based log that can be used as fuel, such as in a woodstove, or as a Ore component, such as in a fireplace. It is also an object to provide such a log that is fabricated relatively easily and economically. Further, it is an object of the invention to provide a hay-based log that can be transported and used safely and more easily than wood logs. Yet further, it is an object of the present invention to provide a hay-based log that is environmentally friendly and is formed of materials that are readily available. It is an object of the present invention to provide a hay-based log that can be used in pre-existing burning devices and delivers heat when burned of satisfactory intensity as well as in fireplaces and the like.

These objects are achieved with the present invention, which is a hay-based log and the method of making the same. The log is formed of a combination of pieces of hay and a binding agent. The hay pieces and the binding agent are compressed together into a solid shape. That shape may be selectable. One suitable shape is cylindrical so that it appears to look like a log. The Invention is not limited thereto. It is believed that hay has not been used as the basis for a log. instead, available logs are either natural wood, wood-based or made of artificial materials.

The hay-based log is fabricated so that the majority of the hay-binder combination is made of the hay. The hay may be 70-80% by weight of the combination but not limited thereto. The binder is selected to be sufficient to keep the hay pieces joined together in its selected shape. The binder may have thermal, characteristics that enhance the thermal characteristics of the hay. The hay-based log is fabricated by mixing the hay and the binder together and then compressing that mixture together with sufficient pressure to enable the binder to retain the hay pieces together. The mixture may also be heated to increase the binding of the hay pieces together.

The hay and binder combination is used to form a log that generates heat or at least a fire, when ignited. The amount of heat generated is dependent on the binder used. In one example, the binder is a wax such as paraffin. A wax-hay combination for a log that is approximately four inches in diameter and approximately 12 inches in length generates approximately the same amount of heat as a dried log of similar dimensions. A hay and binder combination in which potato starch is the binder has also been found to be effective. A potato starch or other natural starch source, such as corn starch, is an effective binder and is also more environmentally friendly than wax. The hay-based log can be used as a replacement for wood logs as hay is plentiful. The hay-based logs are relatively easily transported and can be used safely and more easily than wood logs. The logs can be made of a selectable shape and so they may be used in pre-existing burning devices.

BRIEF DESCRIPTION OF THE DRAWINGS

FIG. 3 is a table showing certain hay-based logs fabricated using the equipment of FIG. 2 showing the conditions of fabrication and resultant log quality.

FIG. 4 is a table showing the results of testing done on certain hay-based log formulations of FIG. 3.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. It should be understood that cutting hay is an inherently imprecise endeavor. Accordingly, ⅛" hay stems should not be construed to mean that substantially all stems are this length—rather this is the intended length but smaller fragments and uncut stems will invariably be included.

Figure 1:
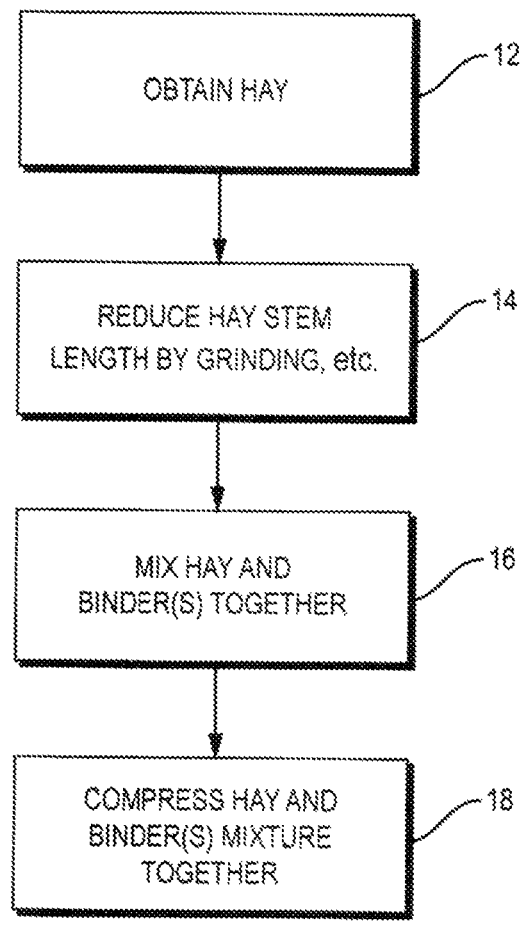
FIG. 1 is a flow diagram depicting the major steps in producing the hay-based log of the present invention.

Referring to FIG. 1, a method 10 of farming a hay-based log of the present invention is shown. In step 12 in forming a hay-based log is to obtain a bale of dry hay. This bale of dry hay should be standard, matured hay that is dried to approximately 9%-15% moisture, and preferably approximately 11% moisture. Hay that is more moist than that may result in pockets that give the product a popcorn appearance, and hay that is less moist than that is expensive as it requires the use of an additional volume of source material. In step 14, the hay should be put through a grinder, hammer mill, or other suitable machinery which reduces the stem length of the hay to approximately ⅛". The hay stems may be in the range of about ⅛" to about ½" in length.

In step 16, approximately 70-80% by weight of processed hay is mixed with approximately 20-30% by weight of a binder or a blend or combination of binders. One suitable binder is chopped wax such as paraffin, which is commercially available as Paraffin Slack Wax, available from Hase Petroleum Wax Company, of Allenton Heights, Ill. Another suitable binder is non-polluting plastic, which is commercially available as PETE polyethylene, available from Alpha Omega Plastics, of Elk Grove Village, Ill. It should be noted that "non-polluting", as used herein, means plastics that meet or exceed the Environmental Protection Agency standards for non-polluting, it should also be understood that recycled plastic may be used, such as that obtained from post-consumer water bottles, shopping bags, etc. Another suitable binder is corn starch, which is commercially available as Corn Starch Endosperm of the Corn, available horn National Starch, LLC, of Indianapolis, Ind. Potato starch may also be used as the binding agent. Rapeseed oil may be used as a binder and/or as a supplement to drive up thermal content of the product.

The heat content of the log is dependent on the particular binder, or blend of binders, used in forming the logs. By way of example, employing wax as the binder yields a hay-based log with the highest British Thermal Unit (BTU, a measure of heat content) rating, the use of a plastic binder for the log yields a lower BTU rating than that of the wax-based log, and corn or potato starch binder for the log yields a BTU rating lower than that of the plastic-based log. Those relative heat content values are based on the same binder content-to-hay radon for each. Logs with particular heat content ratings may be selected by consumers as a function of desired heat output. For example, some heating devices, such as wood stoves, should not be fueled with fuels that burn too hotly.

Returning to FIG. 1, in step 18, the binder and hay mixture is formed into the hay-based log. This is accomplished by filling a compression device, such as a press die, with the mixture of binder and processed hay and subsequently applying approximately 12 tons of pressure to the mixture. The contents of the press die may also be heated to enhance binding of the hay pieces. In particular, the hay pieces and binder mixture may be heated to about 210° F. to about 260° F. with an average of about 240° F. for about 30 minutes. The press may be a wood pellet machine press, or similar type of press, modified to use a different die with a larger diameter than a die used to form wood pellets. The resulting hay-based log can be substantially cylindrical in shape, with an approximately 4" diameter and an approximately 12" length. The hay-based fuel log is cooled after the compression step and packaged or otherwise processed for transport. That is, the hay-based log is removed from the press die and allowed to cool at atmospheric conditions for about 10 minutes to about 15 minutes. Less than that may lead to cracking of the product and more than that may lead to undesirable hardening of the product.

Figure 2:
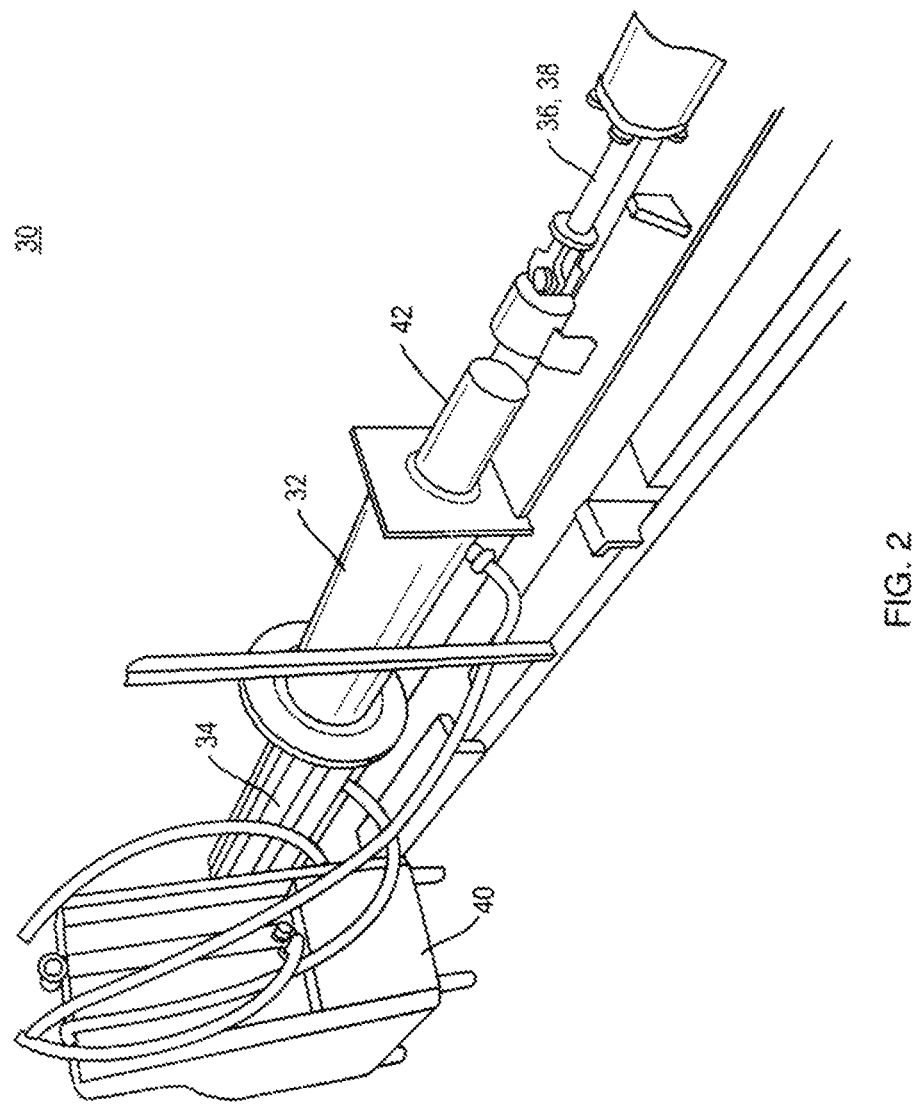
FIG. 2 is a perspective view of a representation of equipment used to make the hay-based log of the present invention.

FIG. 2 shows an example system 30 for making the hay-based log of the present invention using the steps described herein. The system 30 includes a double-walled containment tube 32, a first hydraulic cylinder 34, a second hydraulic cylinder 36 with end cap 38 and re-circulation tubing 40. The containment tube 32 has a four-inch inside diameter. The containment tube 32 allows for a heating or cooling fluid to be re-circulated through it to control the temperature of the log making process. The first hydraulic cylinder 34 is arranged to compress material within the containment tube 32 and the second hydraulic cylinder is arranged to cap the opposing end of the containment tube 32 to establish substantially uniform pressure on the contents within the tube 32. The re-circulation tubing 40 connects a source of heat or cooling, such as hot or cold water or steam, to the space between the two walls of the containment tube 32 for introducing heating or cooling to the hay-binder mixture within the containment tube 32. The re-circulation and temperature control of the heating/cooling fluid may be done with a Delta-T oil heater. FIG. 2 shows a hay-based log 42 of the present invention being ejected from the containment tube 32.

The system 30 was used to make 15 examples of the log 42 at the University of Maine Process Development Center of Orono, Me. To produce the hay logs, bales of hay from Bragdon Farms of Yassalboro, Me., were first reduced in particle size using a Munson Machinery screen classifying cutter. Several particle size fractions from about 0.5 inches down to about 0.125 inches were tested. There did not appear to be any improvements from varying the particle size of the hay. All hay particle sizes compressed well. The larger particle size did however have a "made from hay" look. The binders used in the fabrication process included various levels of paraffin wax, unmodified corn starch, dry distillers grain (DDG), glycerin, glycerin/starch blend and recycled plastic. A log was also made of hay pieces without any binder additive.

The process of making a log 42 using the system 30 begins by mixing together hay pieces and binder. The first hydraulic cylinder 34 is retracted from a first end of the containment tube 32 so that the interior of the containment tube 32 is accessible. The interior of the containment tube 32 is then tilled with the hay-binder mixture. The second hydraulic cylinder 36 and cap 38 are then moved into position at a second end of the containment tube 32 to close off the interior of the second end of the containment tube 32 and apply uniform pressure to the contents of the tube 32 that is approximately equal to the pressure applied by the first hydraulic cylinder 34 at the first end of the tube 32. The first hydraulic cylinder 34 Is then actuated to compress the mixture within the tube 32 until 12 tons of pressure was achieved. The compressed log may then be heated to a selectable temperature for a selectable amount of time. For the formulation examples described herein, all examples were heated for about 30 minutes, and then cooled for about one hour. The second hydraulic cylinder 36 and the cap 38 were retracted and the log 42 was ejected from within the tube 32 by further extending the first hydraulic cylinder 34. The table of FIG. 3 shows 15 formulations made using the system 30 and the steps described above. The heating temperatures applied to each fabricated log are also shown in the table.

A portion of the 15 fabricated logs were tested for moisture content, ash content, BTU content and log density using standard test methods listed in FIG. 4. The estimated material costs for each of the tested samples were also calculated. The cost calculation was on a per log basis (4 inch diameter×12 inches long) at the manufactured density. For comparison, a commercially produced fire log (Pine Mountain Fire Log) from Conros Corporation Canada was also tested. The test results are shown in the table of FIG. 4. Of the formulations tested, samples containing wax or plastic as binders resulted in the highest quality logs in terms of appearance, with no apparent cracking and remained intact. Logs produced with 20% starch as the binder also looked satisfactory. Some of the remaining formulations evaluated, where the logs experienced slight cracking and breaking may also be suitable to produce fire logs under commercial log press conditions where the applied hydraulic pressure can in some machines be higher than the 12 tons generated by the hydraulic cylinders 34 and 36 of the system 30. The BTU values for the hay logs produced were lower than the wood-based control sample, but that is to be expected as the control sample contains approximately 50% wax, which is substantially more than used in the hay-based logs of the present invention. The petroleum-based binders such as the wax and the plastic significantly increased the BTU content of the fabricated hay-based logs when compared to the log made of hay alone. The remaining formulations such as 100% hay, hay with starch and hay with DDG averaged approximately 8,500 BTU/lb, which is similar to wood pellets. These results suggest that suitable quality fuel logs can be made with several of the hay-based formulations tested. These values are summarized in Table 2.

Produced hay-based logs can be packaged (either individually or in groups) for transportation to, and use by, end users. The hay-based log of the present invention can be used as a conventional wood log is used in a wood stove, fireplace, camp fire or the like, as desired. The hay-based log can be used for use in a fireplace, cooking, warming water and heating the inside area of a building. If the log is packaged in wrapping, that wrapping may be formed of a material suitable for burning as well, such as the packaging used for commercially available burnable logs. The packaging may be useful in initiating the burn of the log of the present invention.

It should be understood, of course, that the foregoing relates to exemplary embodiments of the invention and that modifications may be made without departing from the spirit and scope of the invention as set forth in the following claims. It should also be understood that ranges of values set forth inherently include those values, as well as all increments between.

What is claimed is:

1. A hay-based log consisting of a mixture of hay and a binder pressed together, said binder selected from a group consisting of plastic, corn starch, and potato starch, and excluding wax.

2. The log of claim 1 wherein the hay is in the range of 70% to 80% by weight of the mixture and the binder is in the range of 20% to 30% by weight of the mixture.

3. The log of claim 1 wherein the binder is a combination of two or more binders selected from the group consisting of plastic, corn starch and potato starch.

4. The log of claim 1 wherein the hay is hay pieces of at least ⅛" length.

5. The log of claim 1 wherein the log is of a cylindrical shape.

6. A method of making a hay-based fuel log comprising the steps of:
   a. processing hay into hay pieces;
   b. mixing the hay pieces with a binder to make a mixture consisting of hay and a binder, said binder selected from a group consisting of plastic, corn starch, and potato starch, and excluding wax; and
   c. pressing the mixture into the form of a log.

7. The method of claim 6 wherein the hay pieces comprise in the range of 70% to 80% by weight of the mixture and the binder is in the range of 20% to 30% by weight of the mixture.

8. The method of claim 6 wherein the binder is a combination of two or more binders selected from the group consisting of plastic, corn starch and potato starch.

9. The method of claim 6 wherein the hay pieces are at least ⅛" in length.

10. The method of claim 6 wherein the step of pressing is carried out in a wood pellet machine press.

11. The method of claim 6 further comprising the steps of:
   d. heating the hay and binder mixture in the range of 210° F. to 260° F. for at least 30 minutes while pressing the mixture; and
   e. allowing the hay and binder mixture to cool in the range of 10 minutes to 15 minutes without pressing or heating the mixture.

* * * * *